United States Patent [19]

Casey

[11] Patent Number: 4,861,470
[45] Date of Patent: Aug. 29, 1989

[54] DEVICE FOR REMOVING WATER FROM A FUEL TANK

[76] Inventor: Edward P. J. Casey, 3546 Speno Dr., San Jose, Calif. 95117

[21] Appl. No.: 121,392

[22] Filed: Nov. 16, 1987

[51] Int. Cl.$^4$ ................ B01D 15/00; B01D 27/08; B01D 29/10

[52] U.S. Cl. ................ 210/172; 210/238; 210/241; 210/282; 210/484; 210/502.1; 210/DIG. 6

[58] Field of Search ............... 210/85, 171, 172, 237, 210/238, 241, 323.2, 335, 337, 338, 342, 470, 471, 455, 484, 502.1, 485, 924, DIG. 6, 266, 282; 34/95

[56] References Cited

U.S. PATENT DOCUMENTS 3,951,812  4/1976  Hsu ................ 210/502.1
4,588,505  5/1986  Walley et al. ........ 210/502.1
4,758,350  7/1988  Pitts et al. ........... 210/484

Primary Examiner—Richard V. Fisher
Assistant Examiner—Joseph Drodge
Attorney, Agent, or Firm—Jack M. Wiseman

[57] ABSTRACT

A water absorbent device for a fuel tank that has a permeable housing through which a liquid passes. Within the permeable housing is a permeable container through which liquid passes. Water absorbing material is contained within paper bags that are disposed within the permeable container for absorbing water within the fuel tank. The permeable container is removably disposed in the housing. At least one end of the housing is an open end, which is closed by a cap for retaining the removable container within the housing. The cap is removed to enable the container to be removed from the housing for replacement. A chain is attached to the housing for placing the housing into the fuel tank and for removing the housing from the fuel tank.

9 Claims, 2 Drawing Sheets

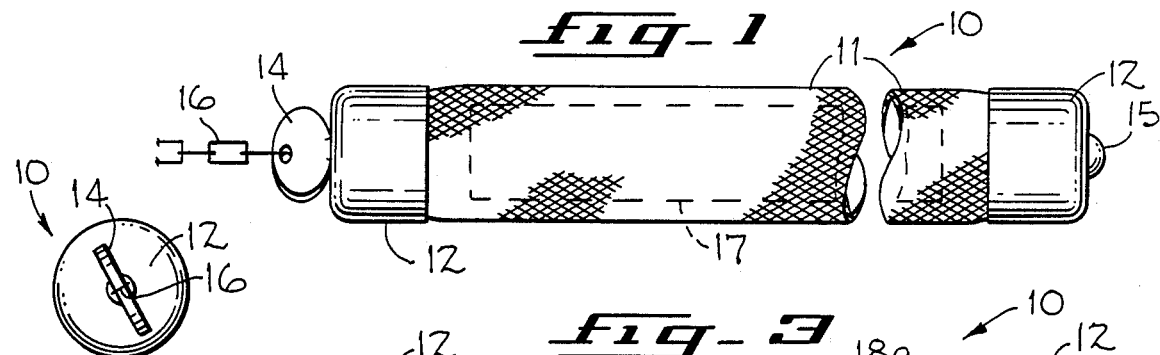
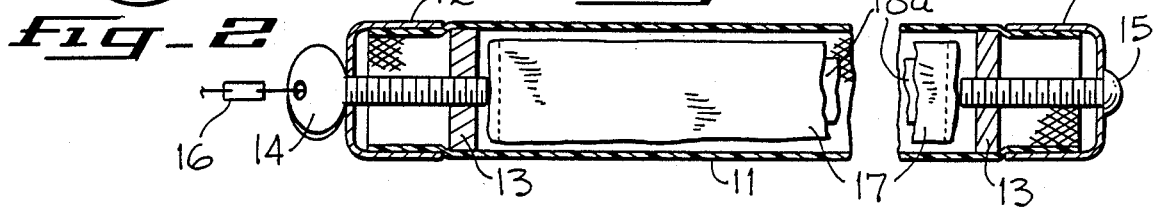
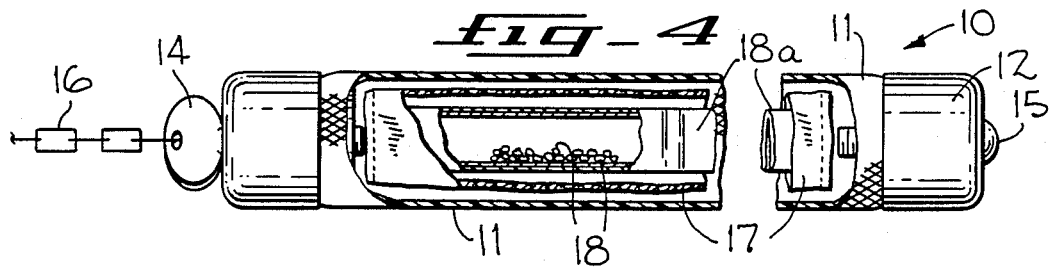
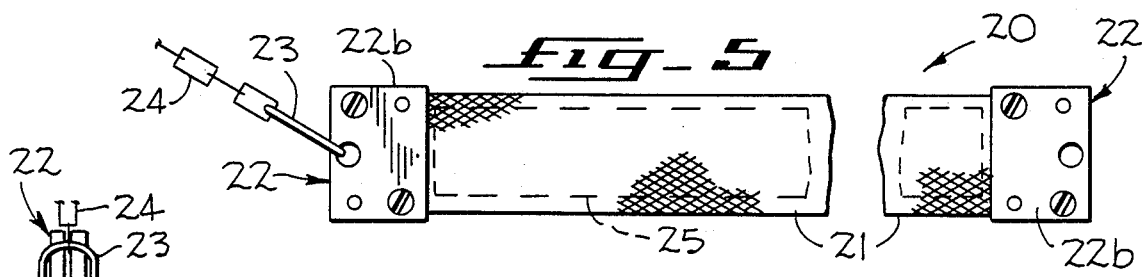
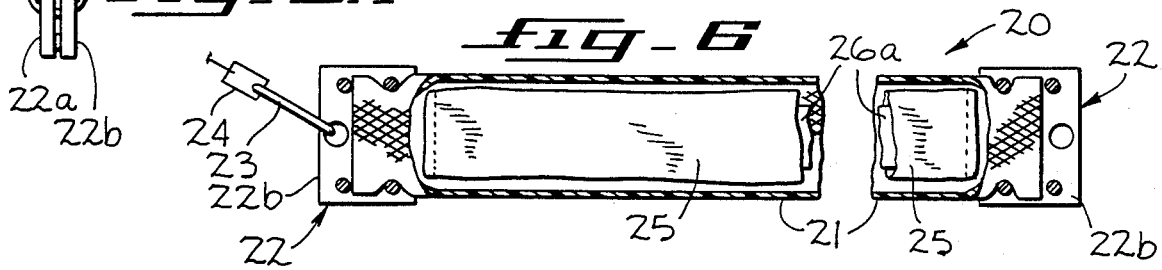
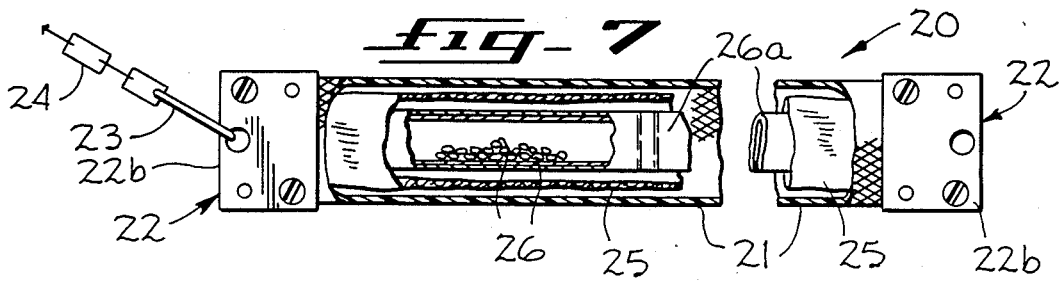

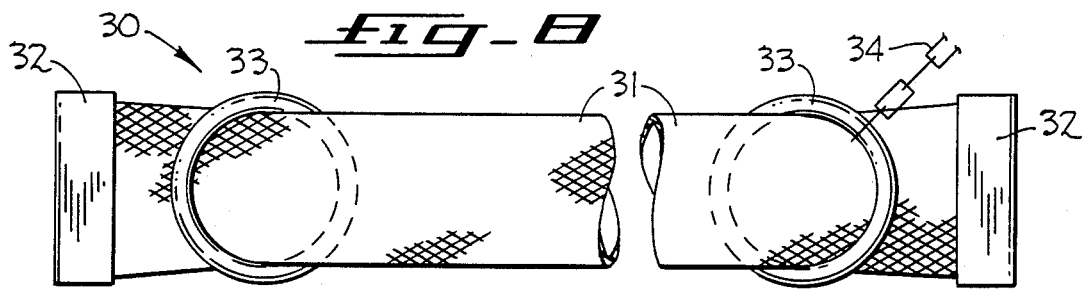
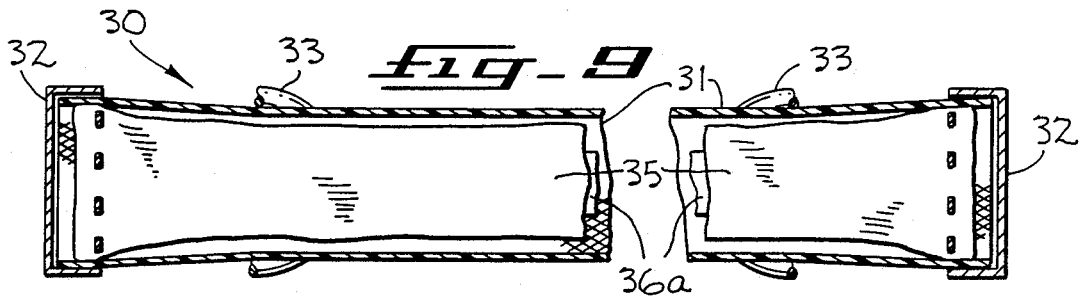
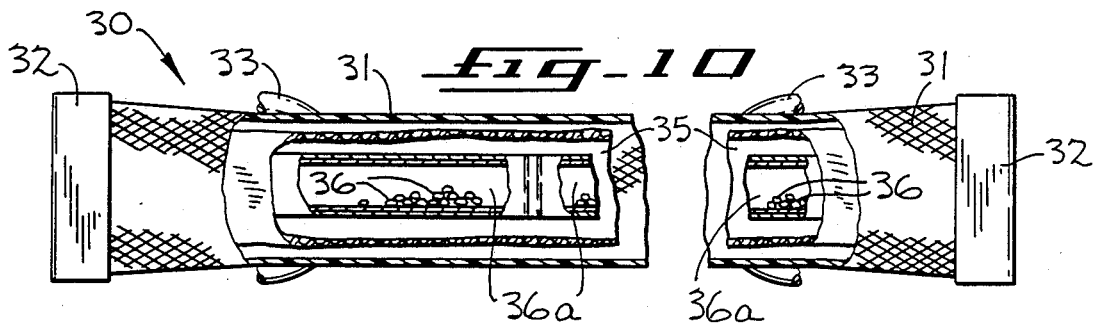
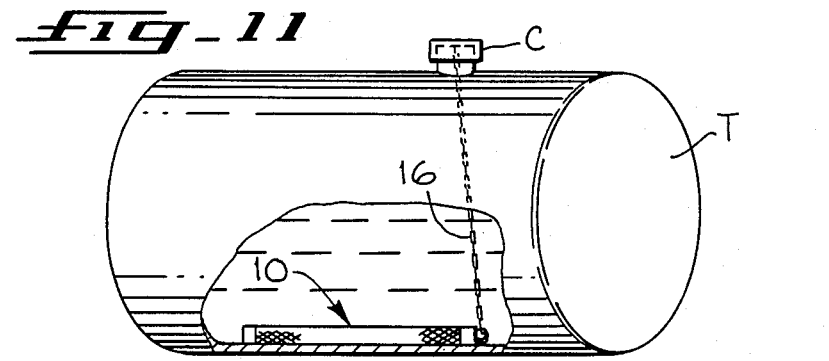
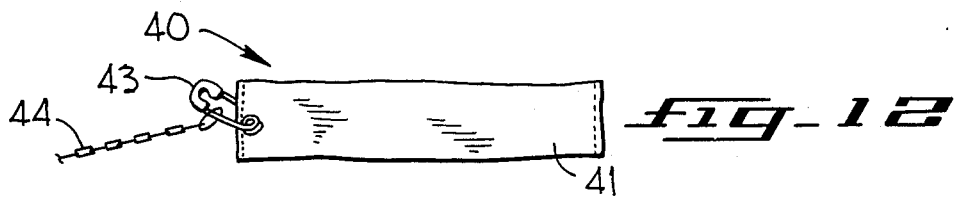
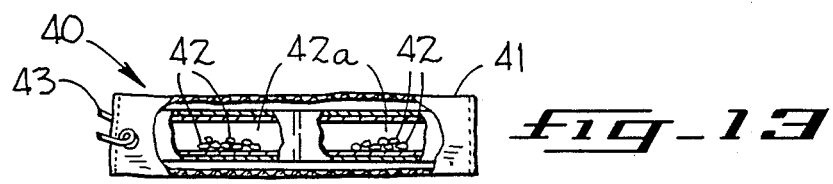

DEVICE FOR REMOVING WATER FROM A FUEL TANK

BACKGROUND OF THE INVENTION

The present invention relates in general to devices for removing water from a fuel tank, and more particularly to a water absorbent device for removing water from a fuel tank.

The collection of water in fuel tanks, such as the fuel tanks of automobiles, aeroplanes, boats and service stations is undesirable, since water mixing with the fuel has a dilatory effect on the operation of a vehicle. Thus, it is desirable to obviate the collection of water in fuel holding tanks, vehicle fuel tanks and the like. Heretofore, it was the practice in holding tanks or the like to open a discharge jet at the bottom of the tank to allow the water to be discharged from the holding tank. The jet remained opened until the operator was able to observe the fuel being discharged.

SUMMARY OF THE INVENTION

An object of the present invention is to provide a water absorbent device for removing water from a fuel tank.

A feature of the present invention is that the water absorbent device is removable from the fuel tank after it absorbs the water and is replaceable with a fresh supply of water absorbent material before it is re-installed in the fuel tank.

Another feature of the present invention is that the water absorbent device expands from the absorption of water and, hence, an operator can observe the need to replace the water absorbent material.

A water absorbent device for a fuel tank comprising a permeable housing through which passes a liquid. Inside the permeable housing is a disposable permeable container. Disposed within the permeable container is a permeable paper bag for holding water absorbing material.

DESCRIPTION OF THE DRAWINGS

FIG. 1 is an elevational view of the water absorbent device embodying the present invention.

FIG. 2 is an end view of the water absorbent device shown in FIG. 1.

FIG. 3 is an axial sectional view of the water absorbent device shown in FIGS. 1 and 2, shown partially in elevation to illustrate the permeable container within a permeable housing.

FIG. 4 is an elevational view of the water absorbent device shown in FIGS. 1-3 and broken away to illustrate the permeable container within the permeable housing, a permeable paper bag within the permeable container and water absorbing material within the permeable paper bag.

FIG. 5 is an elevational view of a modification of the water absorbent device shown in FIGS. 1-4.

FIG. 5A is an end of the water absorbent device shown in FIG. 5.

FIG. 6 is an elevational view of the water absorbent device shown in FIG. 5 and broken away to illustrate the permeable container within the permeable housing.

FIG. 7 is an elevational view of the water absorbent device shown in FIGS. 5 and 6 and broken away to illustrate the permeable container within the permeable housing, the permeable paper bag within the permeable container, and the water absorbing material within the permeable paper bag.

FIG. 8 is an elevational view of another modification of the water absorbent device shown in FIGS. 1-4.

FIG. 9 is an axial sectional view of the water absorbent device shown in FIG. 8, shown in elevation to illustrate the permeable container within the permeable housing.

FIG. 10 is an elevational view of the water absorbent device shown in FIGS. 8 and 9 and broken away to illustrate the permeable container within the permeable housing, the permeable paper bag within the permeable container, and the water absorbing material within the permeable paper bag.

FIG. 11 is a diagrammatic illustration of the water absorbent device of the present invention disposed in a fuel tank.

FIG. 12 is an elevation view of a still further modification of the water absorbent device of the present invention.

FIG. 13 is an elevational view of the water absorbent device of FIG. 12 with a portion thereof broken away to illustrate the permeable paper bag and the water absorbent material.

DESCRIPTION OF THE PREFERRED EMBODIMENTS

Illustrated in FIGS. 1-4 is a water absorbent device 10 for use in removing water that has collected in a fuel tank T (FIG. 11). The water absorbent device 10 of the present invention is disposed within the fuel tank T during use and is removable from the fuel tank T after absorbing water that has collected in the fuel tank T.

The water absorbent device 10 embodying the present invention comprises a housing 11 (FIGS. 1-4) made of permeable material so as to allow liquid to advance therein. In the exemplary embodiment, the housing 11 is made of braided polyester yarn and has a web and openweave construction for the passage of liquid therethrough. The ends of the housing 11 are opened. The material of the housing 11 does not react adversely to vehicle fuel, such as gasoline or diesel fuel.

At each of the housing 11 is a cap 12. Each cap 12 includes a cylindrical body that receives the confronting end of the housing 11. Each cap 12 is made of suitable material, such as copper, which is non-corrosive when subjected to vehicle fuel, such as gasoline or diesel fuel. Disposed within each end of the housing 11 is a cylindrical plug 13. Each plug 13 is made of suitable material, such as copper, which is non-corrosive when subjected to vehicle fuel, such as gasoline or diesel fuel.

Formed in each plug 13 is an axial opening surrounded by a threaded wall. Aligned with the axial opening of each of the plugs 13 is an axial opening of the associated cap 12. A stainless steel thumb screw 14 is inserted through the axial opening of one of the caps 12 and is disposed in threaded engagement with the wall surrounding the axial opening of the associated plug 13. A stainless steel screw 15 is inserted through the axial opening of the other cap 12 and is disposed in threaded engagement with the wall surrounding the axial opening of the associated plug 13. The ends of the housing 11 are clamped within the body of the associated cap 12 between the confronting ends of the associated cap 12 and the plug 13. Thus, each cap 12 is removably secured to an end of the housing 11.

Detachably secured to the one cap 12 by means of the thumb screw 14 is a suitable chain 16. The chain 16 serves to enable an operator to place the water absorbent device 10 within the fuel tank T and to remove the same from the fuel tank T. The free end of the chain 16, in the exemplary embodiment, is connected to a cap C of the fuel tank T. In the preferred embodiment, the chain 16 is made of brass.

Removably disposed within the housing 11 is a disposable container 17. The container 17, in the exemplary embodiment, is made of suitable permeable material, such as polypropylene. Liquid within a fuel tank passes within the container 17. The container 17 does not react adversely to vehicle fuel, such as gasoline or diesel fuel. In the exemplary embodiment, the container 17 is completely enclosed and has a generally flat configuration. The container 17, in the exemplary embodiment, is sewn closed at the ends thereof. In the preferred embodiment, the container 17 is removably disposed within the housing 11.

Contained within the container 17 is suitable water absorbing material 18 packaged in paper bags 18a, such as filter paper bags used to package tea leaves. In the preferred embodiment, the water absorbing material 18 is a gelatinized starch-hydrolyzed polyacrylonitride graft copolymer using potassium hydroxide. The absorbing material 18 is in the form of small crystal-like particles and is sold by Industrial Services International, Inc. of Bradenton, Florida as TERRA-SORB. In the exemplary embodiment, each paper bag 18a contains approximately two grams of water absorbing material 18 and three paper bags 18a folded-over lengthwise are disposed within the container 17. Another well-known absorbent material is silicon gel, which is porous and is made by coagulation of hydrated silica.

The paper bags 18a serve to prevent the water absorbing material 18 from mixing with fuel contained in the fuel tank T. The disposable container 17 is employed to contain the water absorbing material 18 for removal in the event there is a tear in the paper bags 18a.

In the preferred embodiment, as the water absorbing material 18 absorbs water, each particle thereof expands. The expansion of each particle of the water absorbing material 18 causes the container 17 to expand to a generally cylindrical configuration. In turn, the housing 11 expands from the expansion of the container 17. Thus, an operator is able to observe the expansion of the housing 11, when the water absorbing device 10 is removed from the fuel tank T. By observing the expanded state of the housing 11, the operator removes one of the caps 12 and replaces the container 17 and the water absorbing material 18 with a replacement container 17 containing water absorbing material 18.

Illustrated in FIGS. 5-7 is a water absorbing device 20, which is a modification of the water absorbing device 10 shown in FIGS. 1-4. The water absorbing device 20 comprises a housing 21 made of permeable material so as to allow liquid to advance therein. In the exemplary embodiment, the housing 21 is made of braided polyester yarn and has a web and open-weave construction for the passage of liquid therethrough. The material of the housing 21 does not react adversely to vehicle fuel, such as gasoline or diesel fuel.

At each end of the housing 21 is a suitable clamp 22. Each clamp 22 includes confronting plates 22a and 22b, which are removably secured together by screws. The clamps 22, respectively, secure therebetween opposite ends of the housing 21. The housing ends are opened ends and are flat when secured between the plates of the clamps 22. Each clamp 22 has a suitable opening to receive a link 23. The link 23, in the exemplary embodiment, is secured to one of the clamps 22. A suitable chain 24 is fastened at one end to the link 23. The chain 24 serves to enable an operator to place the water absorbent device 10 within the fuel tank T and to remove the same from the fuel tank T. In the preferred embodiment, the chain 24 is made of brass.

Removably disposed within the housing 21 is a disposable container 25. The container 25, in the exemplary embodiment, is made of suitable permeable material, such as polypropylene. Liquid within a fuel tank passes within the container 25. The container 25 does not react adversely to vehicle fuel, such as gasoline or diesel fuel. In the exemplary embodiment, the container 25 is completely enclosed and has a generally flat configuration. The container 25, in the exemplary embodiment, is sewn closed at the ends thereof. In the preferred embodiment, the container 25 is removably disposed within the housing 21.

Contained within the container 25 is suitable water absorbing material 26, which is packaged in paper bags 26a, such as filter paper bags used to package tea leaves. In the preferred embodiment, the water absorbing material 26 is a gelatinized starch-hydrolized polyacrylonitride graft copolymer using potassium hydroxide. The absorbing material is in the form of small crystal-like particles and is sold by Industrial Services International, Inc. of Bradenton, Florida as TERRA-SORB. In the exemplary embodiment, each paper bag 26a contains approximately two grams of water absorbing material 26 and three paper bags 26a folded-over lengthwise are disposed within the container 25. Another well-known absorbent material is silica gel, which is porous and is made by coagulation of hydrated silica.

The paper bags 26a serve to prevent the water absorbing material 26 from mixing fuel contained in the fuel tank T. The disposable container 25 is employed to contain the water absorbing material 26 for removal in the event there is a tear in the paper bags 26a.

In the preferred embodiment, as the water absorbing material 26 absorbs water, each particle thereof expands. The expansion of each particle of the water absorbing material 26 causes the container 25 to expand to a generally cylindrical configuration. In turn, the housing 21 expands from the expansion of the container 25. Thus, an operator is able to observe the expansion of the housing 21, when the water absorbing device 20 is removed from the fuel tank T. By observing the expanded state of the housing 21, the operator removes one of the clamps 22 and replaces the container 25 with a replacement container 25 containing water absorbing material 26.

Illustrated in FIGS. 8-10 is a water absorbing device 30, which is a further modification of the water absorbing device 10 shown in FIGS. 1-4. The water absorbing device 30 comprises a housing 31 made of permeable material so as to allow liquid to advance therein. In the exemplary embodiment, the housing 31 is made of braided polyester yarn and has a web and open-weave construction for the passage of liquid therethrough. The material of the housing 21 does not react adversely to vehicle fuel, such as gasoline or diesel fuel.

At each end of the housing 31 is a suitable metallic closure 32. Each metallic closure 32 includes teeth to grip the respective ends of the housing 31 for securing the enclosures to the housing 31. Suitable rings 33 encircle the housing 31. The diameter of the rings 33 is less than the length of each closure 32. Thus, the closures 32 serve as stops to retain the rings 33 about the housing 31. A suitable chain 34 is fastened at one end to one of the rings 33. The chain 34 serves to enable an operator to place the water absorbent device 30 within the fuel tank T and to remove the same from the fuel tank T. The chain 34, in the exemplary embodiment, is made of suitable material, such as brass.

Disposed within the housing 31 is a disposable container 35. The container 35, in the exemplary embodiment, is made of suitable permeable material, such as polypropylene. Liquid within a fuel tank passes within the container 35. The container 35 does not react adversely to vehicle fuel, such as gasoline or diesel fuel. In the exemplary embodiment, the container 35 is completely enclosed and has a generally flat configuration. The container 35, in the exemplary embodiment, is sewn closed at the ends thereof. In the preferred embodiment, the container 35 is removably disposed within the housing 31.

Contained within the container 35 is suitable water absorbing material 36 packaged in paper bags 36a, such as paper bags used to package tea leaves. In the preferred embodiment, the water absorbing material 36 is a gelatinized starch-hydrolized polyacrylonitride graft copolymer using postassium hydroxide. The absorbing material is in the form of small crystal-like particles and is sold by Industrial Services International, Inc. of Bradenton, Florida as TERRA-SORB. In the exemplary embodiment, each paper bag 36a contains approximately two grams of water absorbing material 36 and three paper bags 36a folded-over lengthwise are disposed within the container 35.

The paper bags 36a serve to prevent the water absorbing material 36 from mixing with the fuel contained in the fuel tank T. The disposable container 35 is employed to contain the water absorbing material 36 for removal in the event there is a tear in the paper bags 36a.

In the preferred embodiment, as the water absorbing material 36 absorbs water, each particle thereof expands. The expansion of each particle of the water absorbing material 36 causes the container 35 to expand to a generally cylindrical configuration. In turn, the housing 31 expands from the expansion of the container 35. Thus, an operator is able to observe the expansion of the housing 21, when the water absorbing device 20 is removed from the fuel tank. By observing the expanded state of the housing 21, the operator removes the water absorbent device 31 and replaces the water absorbent device 31 with a replacement water absorbent device 31.

Illustrated in FIGS. 12 and 13 is a water absorbent device 40. The water absorbent device 40 comprises a container 41, which is made of suitable permeable material, such as polypropylene. Liquid within a fuel tank, such as fuel tank T, passes within the container 41. The container 41 does not adversely react to vehicle fuel, such as gasoline or diesel fuel. In the exemplary embodiment, the container 41 is completely enclosed and has a generally flat configuration.

Contained within the container 41 is suitable water absorbing material 42 packaged in paper bags 42a, such as paper bags used to package tea leaves. In the preferred embodiment, the water absorbing material 42 is a gelatinized starch-hydrolized polyacrylonitride graft copolymer using potassium hydroxide. The absorbing material is in the form of small crystal-like particles as is sold by Industrial Services International, Inc. of Bradenton, Florida as TERRA-SORB. In the exemplary embodiment, each paper bag 42a contains approximately two grams of water absorbing material 42 and three paper bags 42a folded-over lengthwise are disposed within the container 41.

Attached to the container 41 is a suitable fastener 43, such as a safety pin. A suitable chain 44 is attached to the fastener 43. The chain 44 serves to enable an operator to place the water absorbent device 40 within a fuel tank, such as the fuel tank T, and to remove the same from the fuel tank. The chain 44, in the preferred embodiment, is made of suitable material, such as brass.

In the preferred embodiment, as the water absorbing material 42 absorbs water, each particle thereof expands. The expansion of each particle of the water absorbing material 42 causes the container 41 to expand to a generally cylindrical configuration. Thus, an operator is able to observe the expansion of the container 41, when the water absorbing device 40 is removed from the fuel tank. By observing the expanded state of the container 41, the operator removes the water absorbent device 40 and replaces the water absorbent device 40 with a replacement water absorbent device.

The paper bags 42a serve to prevent the water absorbing material from mixing with fuel contained in the fuel tank T.

In forming the paper bags 18a, 26a, 36a and 42a, filter paper is removed from a roll of filter papers. The filter paper is folded-over midway between the longitudinal edges, thus providing a folded closure along one longitudinal edge. Then, transverse sealed seams are formed by a suitable heat sealing device, thus defining successive filter paper bags. Through the open longitudinal edge, water absorbing crystals, such as water absorbing crystals 18, 26, 36 and 42, are inserted, respectively, in each successive filter paper bag adjacent its associate sealed seam and in the transverse direction. Approximately two grams of water absorbing crystal are inserted in each filter paper bag. The space occupied by the water absorbing crystal in each bag is approximately two inches by two inches. Now, the other longitudinal edge is sealed longitudinally by a suitable heat sealing device.

The forming of the paper bags is repeated with the exception that no water absorbing crystal is added in the forming of the second overlap layer. Thus, the paper bags are double wrap. After the double wrap is completed, the paper bags are cut transversely in groups of three successive bags. Each group of three successive bags is folded longitudinally along a center line. Each folded group of three successive bags is inserted into its associated disposable tubular container. The disposable container is then sewn at the ends thereof and along a longitudinal edge thereof. The other longitudinal edge thereof is a folded closure. The process for filling the filter paper bags of the present invention is similar to the process used for filling tea bags.

What is claimed is:
1. A water absorbent device comprising:
 (a) a permeable housing having at least one open end;
 (b) permeable means removably disposed within said housing, said permeable means including a removable permeable container;
 (c) water absorbing material disposed within said permeable container; and
 (d) a removable closure at said open end of said housing for retaining said removable permeable con- tainer within said housing and for removing said removable permeable container from said housing.

2. A water absorbent device as claimed in claim 1 and comprising attachment means attached to said closure for facilitating the movement of said housing to and from various locations.

3. A water absorbent device comprising:
   (a) a permeable housing;
   (b) permeable means disposed within said housing;
   (c) water absorbing material disposed within said means;
   (d) a ring encircling said housing;
   (e) rigid stop means at each end section of said housing, the length of each of said stop means being greater than the diameter of said ring to retain said ring about said housing; and
   (f) attachment means attached to said ring for facilitating the movement of said housing to and from various locations.

4. A water absorbent device comprising:
   (a) a permeable housing;
   (b) permeable means removably disposed within said housing; and
   (c) water absorbing material disposed within said permeable means,
   (d) said housing having at least one open end, and said permeable means including a removable permeable container;
   (e) a removable closure at said open end of said housing for retaining said removable container within said housing and for removing said container from said housing, said removable closure comprising confronting separable flat plates removably gripping said open end of said housing.

5. A water absorbent device as claimed in claim 4 and comprising attachment means attached to said closure for facilitating the movement of said housing to and from various locations.

6. A water absorbent device comprising:
   (a) a permeable housing having at least one open end;
   (b) permeable means disposed within said housing, said permeable means including a permeable container;
   (c) water absorbing material disposed within said means; and
   (d) a removable closure at said open end of said housing for retaining said container within said housing and for removing said container from said housing,
   (e) said removable closure comprising a cylindrical cap disposed at said open end of said housing exteriorly of said housing, a plug disposed at the open end of the housing within said housing, said cap being formed with an axial opening, said plug being formed with an axial opening aligned with said axial opening of said cap, said axial opening of said plug between surrounded by a threaded wall, and threaded means received by said axial opening of said cap and said axial opening of said plug in threaded engagement with the threaded wall surrounding said axial opening of said plug for removably securing said cap to said housing at the open end thereof.

7. A water absorbent device as claimed in claim 6 and comprising attachment means attached to said closure for facilitating the movement of said housing to and from various locations.

8. The combination of a fuel tank and a water absorbent device, said water absorbent device comprising:
   (a) a permeable housing disposed within said fuel tank, said housing having at least one open end;
   (b) permeable means removably disposed within said housing, said permeable means including a removable permeable container;
   (c) water absorbing material disposed within said removable permeable container; and
   (d) a removable closure at said open end of said housing for retaining said removable permeable container within said housing and for removing said removable permeable container from said housing.

9. The combination as claimed in claim 8 and comprising attachment means attached to said closure for facilitating the movement of said housing to and from various locations.

* * * * *